A. T. STURT.
DRIVING CLEAT MECHANISM FOR MOTOR VEHICLE DRIVING WHEELS.
APPLICATION FILED DEC. 4, 1919.
1,422,009.
Patented July 4, 1922.
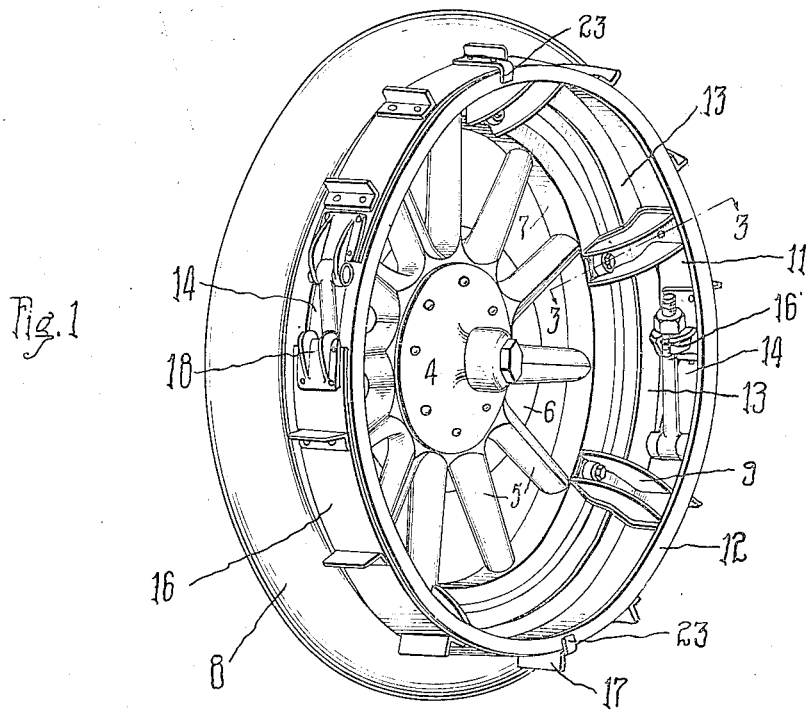
Fig. 1
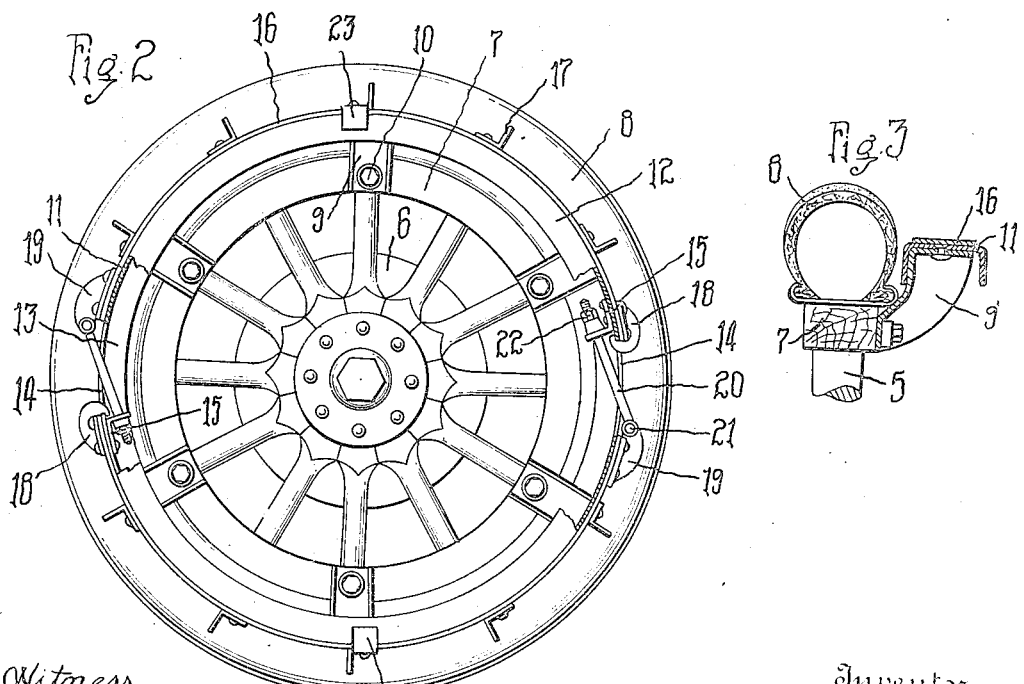
Fig. 2
Fig. 3
Witness
Inventor
Alfred T. Sturt
By his Attorneys
Blackmore, Spencer & Flint.

UNITED STATES PATENT OFFICE.

ALFRED T. STURT, OF NEW YORK, N. Y., ASSIGNOR TO GENERAL MOTORS CORPORATION, OF DETROIT, MICHIGAN, A CORPORATION OF DELAWARE.

DRIVING CLEAT MECHANISM FOR MOTOR-VEHICLE DRIVING WHEELS.

1,422,009.   Specification of Letters Patent.   Patented July 4, 1922.

Application filed December 4, 1919. Serial No. 342,367.

*To all whom it may concern:*

Be it known that I, ALFRED T. STURT, a citizen of the United States, and a resident of New York, county of New York, and State of New York, have invented certain new and useful Improvements in Driving Cleat Mechanism for Motor-Vehicle Driving Wheels, of which the following is a full, clear, concise, and exact description, such as will enable others skilled in the art to which the invention relates to make and use the same, reference being made therein to the accompanying drawings, which form a part of this specification.

My invention relates to vehicle wheels, and especially to wheels designed for use as the driving wheels of automobiles, motor trucks, and similar self-propelled vehicles; and the principal object of my invention is to provide an improved auxiliary driving device having cleats or equivalent projections upon its periphery to thereby secure a more secure engagement between the wheel and the surface over which it is moving, in order to prevent the slipping of the driving wheel when the vehicle is traveling over soft, sandy or muddy ground.

A further object of my invention is to provide an improved cleat mechanism or cleat device which may be readily attached to and removed from a driving wheel of a motor propelled vehicle, to thereby increase the grip of the wheel upon the ground along which it is to travel and prevent the slipping thereof.

A further object of my invention is to provide a vehicle driving wheel having a cleat supporting member or rim normally secured to the felly thereof, and to which rim a plurality of cleat supporting strips may be readily secured if and when it becomes desirable to provide cleats for preventing the driving wheels from slipping; but which cleat supporting strips and cleats may be readily removed and the wheel used without them under ordinary conditions, and when cleats are not necessary to secure a proper driving effect.

A further object of my invention is to provide a vehicle driving wheel having a suitable cleat supporting rim, in combination with a plurality of independent cleat supporting strips each extending part way only around the periphery of the rim; but which cleat supporting strips are all alike, so that a single form of strip is employed throughout and so that any given strip will fit any portion of the rim in question to which it is applied and secured.

With the above and other objects of invention in view my invention consists in the improved vehicle wheel and driving cleats therefor illustrated in the accompanying drawing and hereinafter described and claimed, and in such variations and modifications thereof, within the scope of the concluding claims, as will be obvious to those skilled in the art to which my invention relates.

In the drawing accompanying and forming a part of this specification and wherein the preferred embodiment of my invention is illustrated:

Figure 1 is a view showing a motor vehicle driving wheel equipped with my invention in perspective.

Figure 2 is a view showing my invention as applied to a vehicle driving wheel in side elevation, certain parts thereof being broken away to better illustrate the same.

Figure 3 is a view showing a section upon a plane transverse relative to the periphery of the wheel, the position of the plane being indicated by the line 3—3, Figure 1.

Referring now to the drawing, the reference numeral 4 designates the hub and 5 the spokes of an ordinary form of motor vehicle wheel, and 6 designates a brake drum secured to and partaking of the movement thereof. The felly of the wheel is indicated by the reference numeral 7, and 8 designates a tire supported by the felly and which may be of any desired kind or type, as will be appreciated.

Located to one side of the felly 7 is a series of brackets 9, which brackets are detachably secured to the felly as by means of bolts 10 extending through holes provided in the inner portion of the brackets and in the felly. These brackets are of such construction that the outer ends or heads thereof are offset and positioned somewhat to one side of the plane of the surface of the felly to which their inner ends are secured; and said outer ends enter into the channel of a cleat supporting rim designated by the reference numeral 11 and which rim is channel shaped in cross-section and is formed with inwardly extending flanges 12, 13 upon opposite sides thereof; the flange 13 extending inward a short distance between the upper ends of the brackets and the portions of the tire and rim adjacent the periphery of the wheel, as best shown in Figures 1 and 3. This rim in the embodiment of my invention illustrated is substantially cylindrical in form and the periphery thereof extends at right angles to the plane of the wheel, and the same is provided with two oppositely located openings 14, 14 formed in its periphery; and the reference numerals 15, 15 designate two abutments secured upon the inner surface of said rim and within the channel thereof and which abutments are located adjacent the openings 14, said abutments being provided each with an opening or slot, as indicated at 16' in Figure 1.

The reference numerals 16, 16 designate two cleat supporting strips identical in form one with the other and which strips are detachably secured to the exterior surface of the rim 11; and each of which strips is provided with a series or road engaging cleats 17 spaced along the outer side thereof. These cleat supporting strips are provided each with a hook 18 secured to one end thereof and which hooks are adapted to engage the end edges of the openings 14, 14 provided in the rim; while the other ends of said cleat supporting strips are provided with means adapted to engage the abutments 15 above referred to to thereby detachably hold the cleat supporting strips and the cleats carried by them in place upon the periphery of the rim; thus providing a construction wherein the strips and cleats may be readily removed from the rim when the roadway along which the vehicle is travelling is in such a condition as not to require the use of cleats on the driving wheels, and as readily put in place should the use of cleats become necessary.

In the form of my invention illustrated the means for securing the ends of the cleat supporting strips remote from the ends having the hooks 18 in place relative to the rim 11 include two brackets 19 secured one to each of the ends in question; while the reference numerals 20, 20 designate two securing bolts pivotally connected at 21 with the brackets 19, and which bolts extend through the openings 14 and through the openings provided in the abutments 15, and the free ends of which bolts are provided with nuts 22 which, upon being tightened, obviously draw the cleat supporting strips 16 into firm engagement with the periphery of the rim 11.

Certain of the cleats 17 adjacent the middle of the cleat supporting strips are preferably provided with inwardly projecting lugs 23 to thereby prevent the middle portion of the strips from slipping sidewise upon the rim 11 and into contact with the tire.

It will be appreciated that upon loosening the nuts 22 the cleat supporting strips as a whole may be removed from the rim; from which it follows that my invention provides a construction in which the rim for supporting the cleats is normally in place upon the wheel (although it may obviously be removed therefrom by removing the bolts 10), and at the same time a construction in which the cleat strips may be readily attached to the rim if and when the vehicle encounters a portion of roadway which is muddy, sandy or otherwise insecure and in which cleats are necessary in order to secure a proper driving action of the driving wheels, and as readily removed from the wheel when it is not necessary to use cleats.

It will be appreciated that the two cleats supporting strips 16 are identical in form one with the other, so that either strip may be placed upon either of the two portions of the rim 11 between the openings 14. This provides cleat mechanism in which a single form of cleat carrying member or strip has to be manufactured and, furthermore, provides a cleat structure in which the cleat supporting strips do not have to be definitely positioned relative to a particular portion of the supporting rims for the driving wheels, as any cleat supporting strip will fit upon any of the portions of the driving wheels of the vehicle between the openings provided in the rims thereof.

Having thus described and explained my invention, I claim and desire to secure by Letters Patent:

1. In a vehicle wheel, a cylindrical rim having a plurality of openings formed therein; abutments secured to the inner surface of said rim and located one adjacent each of the openings aforesaid; a plurality of cleat supporting strips each having a hook at one end adapted to engage an end edge of one of said openings; and securing bolts pivotally connected one with the other end of each of said cleat supporting strips, and which bolts extend through the openings aforesaid in said rim and through openings provided one in each of said abutments when the strips are in place upon the rim, to thereby detachably secure said cleat supporting strips in place.

2. In a vehicle wheel, a cylindrical rim having a plurality of oppositely located openings formed therein; a plurality of cleat supporting strips each having a hook at one end adapted to engage an end edge of one of said openings; and securing members connected one with the other end of each of said cleat supporting strips and through which said other ends may be detachably secured to said rim.

3. In a vehicle wheel, a cylindrical rim having an opening therein, an abutment secured to the inner surface of the rim adjacent said opening, a cleat supporting strip having a hook at one end adapted to engage an edge of said opening, means on the other end of the strip extending through the opening and engaging said abutment, said means comprising a bolt and nut whereby the strip may be tightened upon the rim.

In testimony whereof I affix my signature.

ALFRED T. STURT.